United States Patent
Meuret

(10) Patent No.: US 11,231,273 B2
(45) Date of Patent: Jan. 25, 2022

(54) ARTICULATING ARM CALIBRATION ARTIFACT SYSTEM AND METHOD OF USE

(71) Applicant: Brunson Instrument Company, Kansas City, MO (US)

(72) Inventor: Mark J. Meuret, Overland Park, KS (US)

(73) Assignee: BRUNSON INSTRUMENT COMPANY, Kansas City, MO (US)

( * ) Notice: Subject to any disclaimer, the term of this patent is extended or adjusted under 35 U.S.C. 154(b) by 0 days.

(21) Appl. No.: 16/935,479

(22) Filed: Jul. 22, 2020

(65) Prior Publication Data

US 2021/0025702 A1 Jan. 28, 2021

Related U.S. Application Data

(60) Provisional application No. 62/876,865, filed on Jul. 22, 2019.

(51) Int. Cl.
| | | |
|---|---|---|
| *G01B 5/00* | (2006.01) | |
| *G01B 21/04* | (2006.01) | |
| *G01B 11/00* | (2006.01) | |
| *G01B 5/008* | (2006.01) | |

(52) U.S. Cl.
CPC ......... *G01B 21/042* (2013.01); *G01B 5/0004* (2013.01); *G01B 5/008* (2013.01); *G01B 11/005* (2013.01)

(58) Field of Classification Search
CPC ............................ G01B 5/0004; G01B 21/042
USPC .......................................................... 33/502
See application file for complete search history.

(56) References Cited

U.S. PATENT DOCUMENTS

| | | | |
|---|---|---|---|
| 4,843,729 A | 7/1989 | Nagaoka et al. | |
| 5,647,136 A * | 7/1997 | Jostlein ................ | G01B 21/042 33/502 |
| 6,493,956 B1 * | 12/2002 | Matsuda ............. | G01B 21/042 33/502 |
| 7,055,367 B2 * | 6/2006 | Hajdukiewicz ...... | G01B 21/042 33/501.02 |

(Continued)

FOREIGN PATENT DOCUMENTS

JP 05-272903 A 10/1993

OTHER PUBLICATIONS

"International Search Report and Written Opinion for International Application No. PCT/US2020/042972, Search completed Nov. 25, 2020, dated Nov. 26, 2020".

*Primary Examiner* — George B Bennett
(74) *Attorney, Agent, or Firm* — Kutak Rock LLP; Brian L. Main

(57) ABSTRACT

A system and method of calibrating a measuring instrument is provided. The system includes a support system for quickly and easily securing a low thermal expansion length reference bar in position. The reference bar is coupled to the support beam using a kinematic mounting system that is designed to reduce or eliminate errors associated with over-constraining the reference bar. The system is optimized for field calibration of certain measuring instruments, such as measuring instruments having articulating arms. Opposed first and second ends of the reference bar include respective first and second retroflectors and/or first and second probe receivers at known distances relative to each other, thereby facilitating calibration of the measuring instrument.

20 Claims, 12 Drawing Sheets

(56) References Cited

U.S. PATENT DOCUMENTS

| | | | | |
|---|---|---|---|---|
| 7,640,674 B2* | 1/2010 | Ferrari | .............. | G01B 21/042 33/502 |
| 7,712,224 B2* | 5/2010 | Hicks | .............. | G01B 21/042 33/502 |
| 7,908,756 B2* | 3/2011 | Clifford | .............. | G01B 21/042 33/502 |
| 8,051,575 B2 | 11/2011 | Bridges et al. | | |
| 10,378,872 B2* | 8/2019 | Sakai | .............. | G01B 5/012 |
| 10,845,192 B2* | 11/2020 | Lause | .............. | B23Q 17/22 |
| 2004/0066508 A1 | 4/2004 | Schmadel | | |
| 2008/0295352 A1 | 12/2008 | Brunson | | |

* cited by examiner

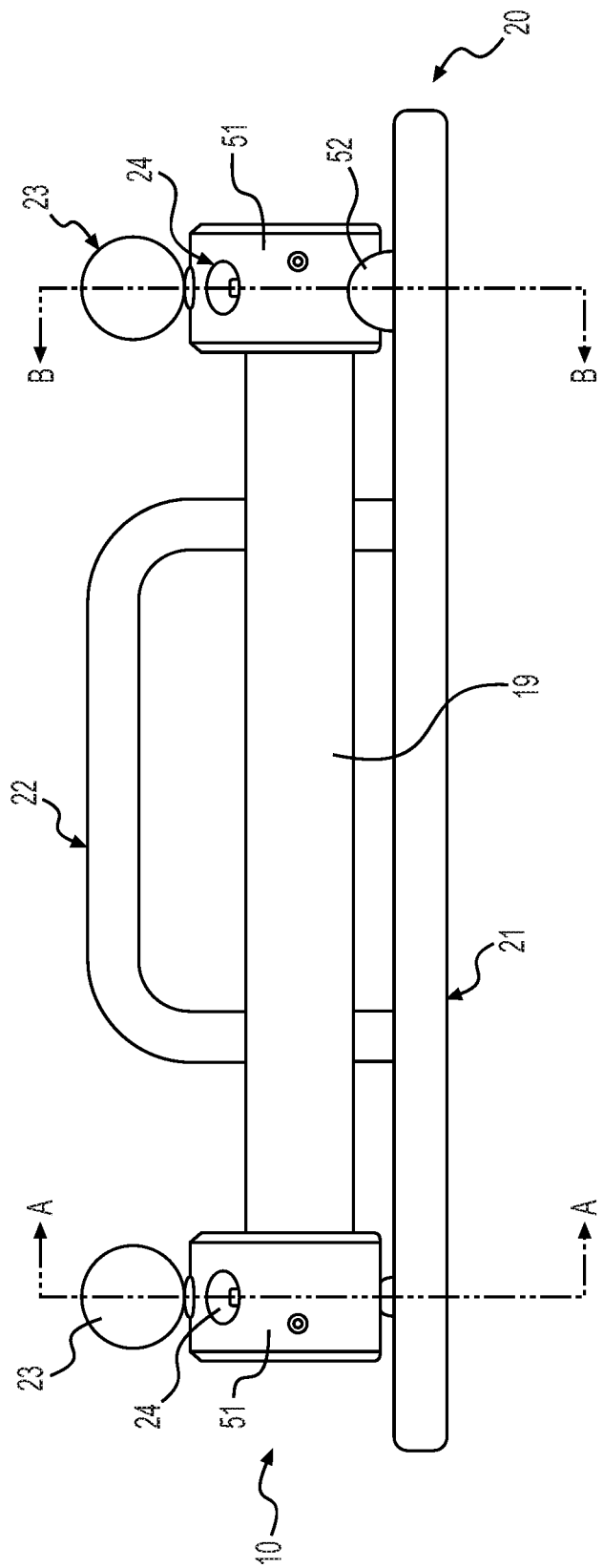

SECTION A-A

ARTICULATING ARM CALIBRATION ARTIFACT SYSTEM AND METHOD OF USE

CROSS-REFERENCE TO RELATED APPLICATIONS

This application claims priority pursuant to 35 U.S.C. 119(e) to U.S. Provisional Patent Application Ser. No. 62/876,865, filed Jul. 22, 2019, the entire disclosure of which is incorporated herein by reference.

FIELD

The present invention relates generally to calibration devices for measuring equipment. More specifically, the present invention is concerned with a system and method for field calibration of high precision measuring instruments, such as articulating arms and the like.

BACKGROUND

A large number of industries require precise and accurate measuring for a number of applications such as production, manufacturing, and process control. In many such applications, measurement errors on the order of even one ten-thousandth of an inch can be critical. Often, especially when measuring the dimensions of objects or distance between two points on an object, special equipment and/or instruments are used to achieve the necessary precision and accuracy for a particular application (each being a "measuring instrument"). Measuring instruments such as Coordinate Measuring Machines (CMMs) and laser trackers are particularly well suited for such applications because they are capable of providing extreme precision and accuracy, even when measuring the dimensions of large objects. An articulating arm is a type of CMM that uses rotary encoders on multiple rotation axes to determine the position of a probe.

It will be understood that some CMMs and/or other measuring instruments are "fixed" instruments, such as fixed CMMs and the like, while others are "portable" instruments, such as portable CMMs (also known as PCMMs) and the like. It will further be understood that fixed instruments are generally configured to measure portable parts, such as parts that are brought to the fixed instrument, while portable instruments are generally configured to be moved to the parts being measured. Laser trackers and articulating arm measuring instruments are two examples of portable instruments due to relative ease associated with moving the same from place to place. Upon moving such instruments into place, calibration is required.

As is the case with calibration (or verifying proper calibration) of virtually any measuring instrument, checking calibration of an articulating arm is typically accomplished by measuring an object (such as a length reference artifact) of a standard, known length and confirming that the instrument measures the appropriate length. In particular, such artifacts are used to verify whether a measuring instrument is yielding trustworthy results (i.e. demonstrating that it is properly calibrated) or used during a measurement job to establish whether anything has gone wrong during the course of the job. For example, a user of the measuring instrument will measure the artifact at the beginning, middle, and end of a job. If the user obtains the same length measurement each time, the user will have a degree of comfort that the measuring instrument has maintained a proper adjustment and/or position during the measurement.

An acceptable method used to verify the proper calibration of a measuring instrument is a length measurement system test. A length measurement system test involves several steps. First, two or more measuring points are located and oriented relative to the measuring instrument. The measuring points are displaced a known distance from each other; the known distance being a reference length. Next, the measuring instrument measures the distance between each measuring point; the measured distance being a measured length. Finally, the measured length is compared with the reference length so as to evaluate the performance of the measuring instrument. Because a measuring instrument may perform differently depending on the position and orientation of measuring points relative to the measuring instrument, the above steps are repeated with the measuring points at various locations and orientations to exercise the various error sources within the measuring instrument.

Some methods for testing and verifying CMM calibration are described at ISO 10360-2:2009 and ISO 10360-12:2016. One method of establishing a reference length is to use a calibrated artifact.

A calibrated artifact includes a measuring point on or near each end of the artifact. Traditionally, artifacts were calibrated at a specific temperature range and nominal thermal expansion corrections are provided to establish the reference length between the measuring points. More recently, several length reference systems have been developed that include structural arrangements that are designed to counteract length increases caused by thermal expansion. For example, U.S. application Ser. No. 13/431,188, now U.S. Pat. No. 8,479,406, the entire disclosure of which is incorporated herein by reference, discloses a length reference bar system and method that compensates for thermal expansion and is capable of being calibrated using the method described in Section D-3 of ASME B89.4.19-2006. Other length reference systems disclosed in U.S. Pat. Nos. 6,505,495, 6,836,323, 7,188,428, and 8,141,264 the entire disclosures of which are incorporated herein by reference, have also been designed to counteract length increases caused by thermal expansion. Still other length reference systems are fabricated from materials having low coefficients of thermal expansion, such as carbon composite and/or high-grade invar, to further reduce the artifact's sensitivity to temperature gradients.

To ensure that a length measurement system test is as accurate as possible, the reference length must be as close as possible to the actual distance between the measuring points at the time the measured length is obtained. Unfortunately, several factors, such as fixturing effects, create uncertainty as to the accuracy of a reference length. Fixturing effects may include, but are not limited to, gravity effects, loading effects, and mounting constraint effects. Fixturing effects may be influenced by factors such as the straightness and/or stiffness of an artifact, the type, quantity, and/or location of mounting fixtures, the location of targets relative to the mounting fixtures, potential vibration, and/or the accuracy of an alignment. Additionally, uncertainty of the artifact temperature and uncertainty of the coefficient of thermal expansion of the artifact material create uncertainty with the thermal expansion correction values (if used).

Fixturing effects may vary with temperature and/or with the orientation of the artifact. Accordingly, fixturing effects may be difficult to detect and/or to predict. For instance, an artifact at room temperature and situated in a vertical orientation may experience negligible fixturing effects while an artifact at twenty degrees above room temperature and situated in a horizontal orientation may experience various fixturing effects such as thermal expansion restraint and/or cantilever bending. Thermal expansion restraint creates additional uncertainty with the thermal expansion correction values. Cantilever bending creates additional uncertainty with the calibrated length of the artifact at various orientations.

To assist users with field calibration of articulating arm CMMs, it is desirable to provide a reference length system and method that is mobile and easy to use. It is further desirable for the reference length system to be attachable to a support plate via a kinematic mount.

SUMMARY

The present invention provides a reference length device (system or manufacture) and method that is mobile and easy to use. The system includes a support architecture the utilizes kinematic mounting (e.g., Kelvin or Maxwell clamps) for quickly and easily securing an artifact, such as a low thermal expansion length reference bar, in position, while minimizing or eliminating fixturing effects and constraint. Thus, the artifact is coupled to the support beam using a kinematic mounting system that is designed to eliminate (or otherwise reduce) errors associated with over-constraining the artifact. The system is optimized for field calibration of certain measuring instruments, such as a PCMM having articulating arms. Each end of the artifact includes at least one reference member, such as a retroreflector (often associated with laser trackers and the like), a matte sphere (often associated with a scanning head positioned on an end of an articulating arm), a receiver (often associated with a probe tip), or the like. Distances between the opposed reference members is known so as to facilitate calibration of the measuring instrument.

BRIEF DESCRIPTION OF THE DRAWINGS

FIG. 2 is a front view of the embodiment of FIG. 1.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
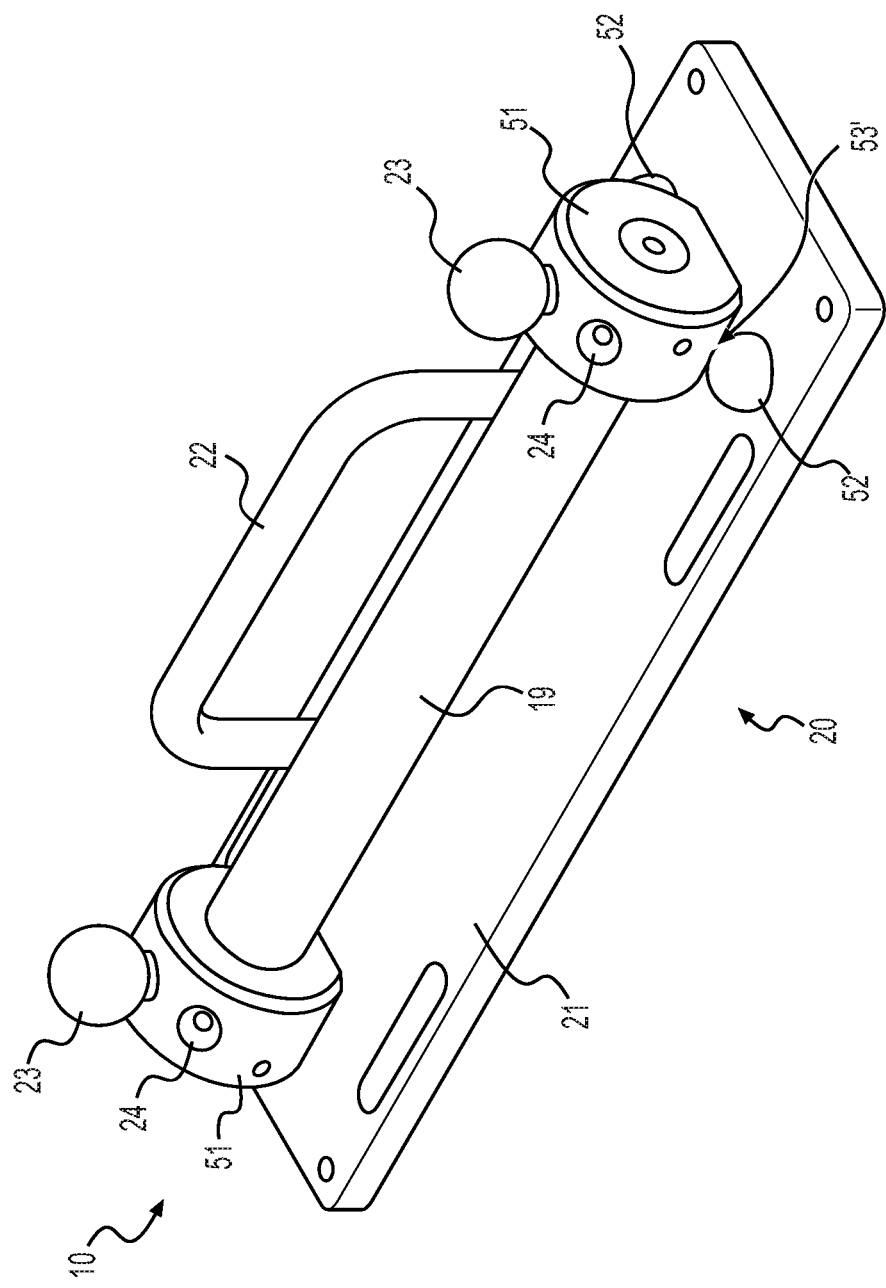
FIG. 1 is an isometric view of one embodiment of an artifact of the present invention engaged with a support structure of the present invention.

Referring to FIG. 1, an isometric view of one embodiment of an artifact 10 of the present invention is shown engaged with a support structure 20 of the present invention (shown in an "engaged configuration"). It will be understood that the artifact 10 is selectively removable from the support structure 20, thereby moving the artifact 10 from an engaged configuration to a disengaged configuration. The support structure 20 shown includes a base plate 21 and a handle 22. In some embodiments, the artifact is a low thermal expansion length reference bar that compensates for thermal expansion, such as the low thermal expansion length reference bar described in U.S. Pat. No. 8,141,264, hereby incorporated by reference. The artifact includes an elongated element 19, such as an elongated cylindrical element 19, and two thermal expansion cancellation elements 51 (each referred to herein as an "end cap" 51), one on each end of the elongated element 19.

Briefly, in some embodiments, an exterior surface of one or more end cap 51 defines at least part of a cylindrical shape. In one embodiment, as the temperature increases and increases a length of the cylindrical element 19 (which would concomitantly push opposing target positions away from each other), a length portion of the end caps 51 that extends inward from ends of the cylindrical element 19 also increases to counteract the cylindrical element 19 increase, such that a location of the target positions on the end caps 51 remains constant. That is, the target positions, by moving further inward toward the center of cylindrical element, provide an inward movement of the target positions to equal and thus cancel out the length increase of the cylindrical element, such that the distance between the target positions remains constant regardless of the temperature.

The artifact is mounted to the base plate 21 via a kinematic mounting system, such as a system having similar functionality to a traditional Kelvin or Maxwell clamp mounting system. In a traditional Kelvin or Maxwell Clamp, three traditional interfaces produce six constraints. In one embodiment, the kinematic mounting system employs a traditional Maxwell clamp system interface with three V-shaped grooves on the base plate and matching interface with three convex curved surfaces on the artifact, preferably at the end caps 51. In another embodiment, the kinematic mounting system employs a traditional Kelvin clamp system interface on the base plate and matching interface on the artifact, preferably at the end caps 51. In some embodiments, a first interface member 34, such as a sphere coupled to the base plate 21, is configured to be received by a first interface feature 36, such as a cone-shaped void defined by a first end cap 51, thereby accomplishing a first interface 32, the first interface 32 being capable of providing translational constraints in all three transitional degrees of freedom. In some embodiments, a second interface member 37, such as a sphere coupled to the base plate 21, is configured to engage with a second interface feature 39, such as a recessed (or non-recessed) surface defined by the first end cap 51, thereby accomplishing a second interface 35, the second interface 35 being one point of contact that is capable of providing a rotational constraint about the first interface 32. Finally, in some embodiments, a third interface member 52, such as a pair of spaced-apart spheres coupled to the base plate 21, is configured to engage with a third interface feature, such as at least partially opposed portions of an outer surface of a second end cap 51, the second end cap 51 being opposed to the first end cap 51, the third interface comprising first 53' and second 53" interface points, each of the first 53' and second 53" interface points being capable of providing a rotational constraint about the first 32 and/or second 35 interface(s).

One advantage of the kinematic mounting system of the present invention is that it allows for positioning and orienting the artifact 10 relative to the base plate 21 with very high repeatability, without over-constraining the artifact or introducing instability. In some embodiments, the kinematic mounting system includes a plurality of kinematic mounts, such as a first ("cone") mount associated with the first interface 32, a second ("flat") mount associated with the second interface 35, and a third ("vee") mount associated with the third interface (53' and 53").

Figure 3B:
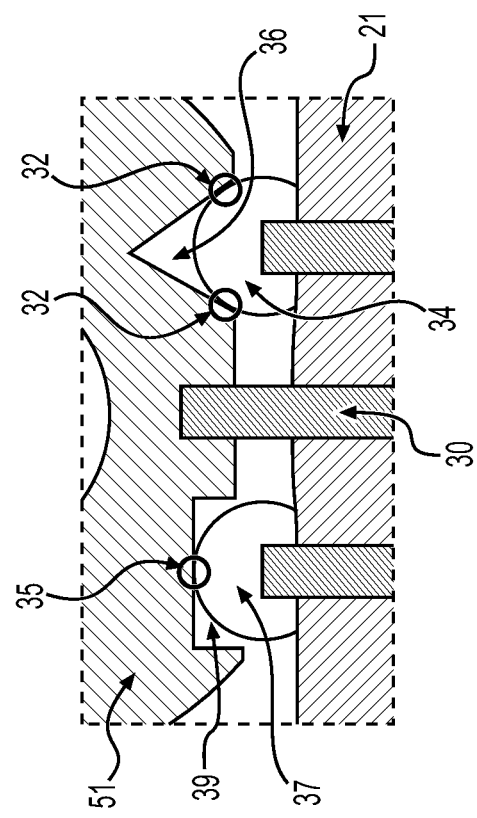
FIG. 3B depicts a blow-up of the cross-sectional view of FIG. 3 showing the interface between artifact and the support structure.
Figure 3A:
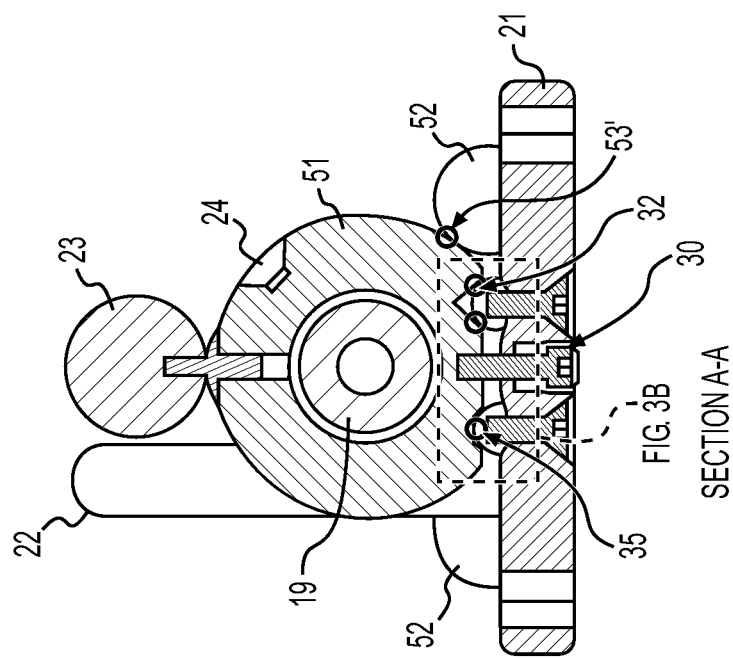
FIG. 3A is a cross-sectional view along the line shown as A-A in FIG. 2.

Referring to FIG. 3A and FIG. 3B, a first end of the artifact is selectively indexed to the support structure by way of first and second kinematic mounts. The first kinematic mount prevents the first end of the artifact from translating in first (longitudinal), second (lateral), and third (vertical) directions, thereby constraining the artifact in respective first, second, and third degrees of translational freedom. The first kinematic mount allows for at least some rotation of the artifact about first (longitudinal), second (lateral), and third (vertical) rotational degrees of freedom. In this way, the first kinematic mount 32 assists in positioning the artifact generally in place while allowing for slight adjustments to the orientation of the artifact relative to the support structure.

In some embodiments, the first kinematic mount includes a first portion associated with the support structure and a second portion associated with the artifact. In some embodiments, the first portion is a sphere or partial sphere (a "first sphere") and the second portion is a void, such as a conical void, a spherical void, or the like, (each referred to herein as a "first void"). In some embodiments, the first void is defined by the first end cap 51. The first void is configured to receive at least a portion of the first sphere so as to facilitate positioning of the artifact relative to the support structure. In some embodiments, the first sphere and the first void are configured such that they share at least three points of contact. In some embodiments, the first sphere and the first void share more than three points of contact, each point of contact being positioned along a single arc (i.e. sphere interface with a conical void) such that the first portion of the first kinematic mount is free to rotate (to at least some degree) about each of the first, second, and third degrees of rotational freedom. In other embodiments, the first void defines at least part of a spherical void (or the equivalent), thereby facilitating contact between the first and second portions at a plurality of points while maintaining rotational freedom (to at least some degree) between the same.

Still referring to FIG. 3A, the second kinematic mount is displaced laterally from the first kinematic mount, thereby providing an indexing feature for orienting the first end of the artifact relative to a first (longitudinal) degree of rotational freedom. The second kinematic mount is configured to allow for differential thermal expansion in the lateral direction, thereby preventing the first end of the artifact from being over-constrained. In some embodiments, the first and second kinematic mounts, together, allow for at least some rotation of the artifact about second (lateral) and third (vertical) rotational degrees of freedom, thereby allowing for rotation of the artifact into place relative to the support structure. In this way, the first and second kinematic mounts provide functionality that is similar to functionality of a cone mount and a flat mount, respectively, of a traditional Kelvin Clamp.

In some embodiments, the second kinematic mount includes a first portion associated with the support structure and a second portion associated with the artifact. In some embodiments, the first portion is a sphere or partial sphere (a "second sphere") and the second portion is a surface, such as a flat indexing surface, (a "first surface") defined by the first end cap 51, such as a flat surface defined by a recessed portion of the first end cap. In some embodiments, the first and second portions of the second kinematic mount are configured so as to facilitate a single point of contact between the same, thereby facilitating indexing of the artifact about the first rotational degree of freedom without over-constraining the artifact in any other degree of freedom.

Figure 4:
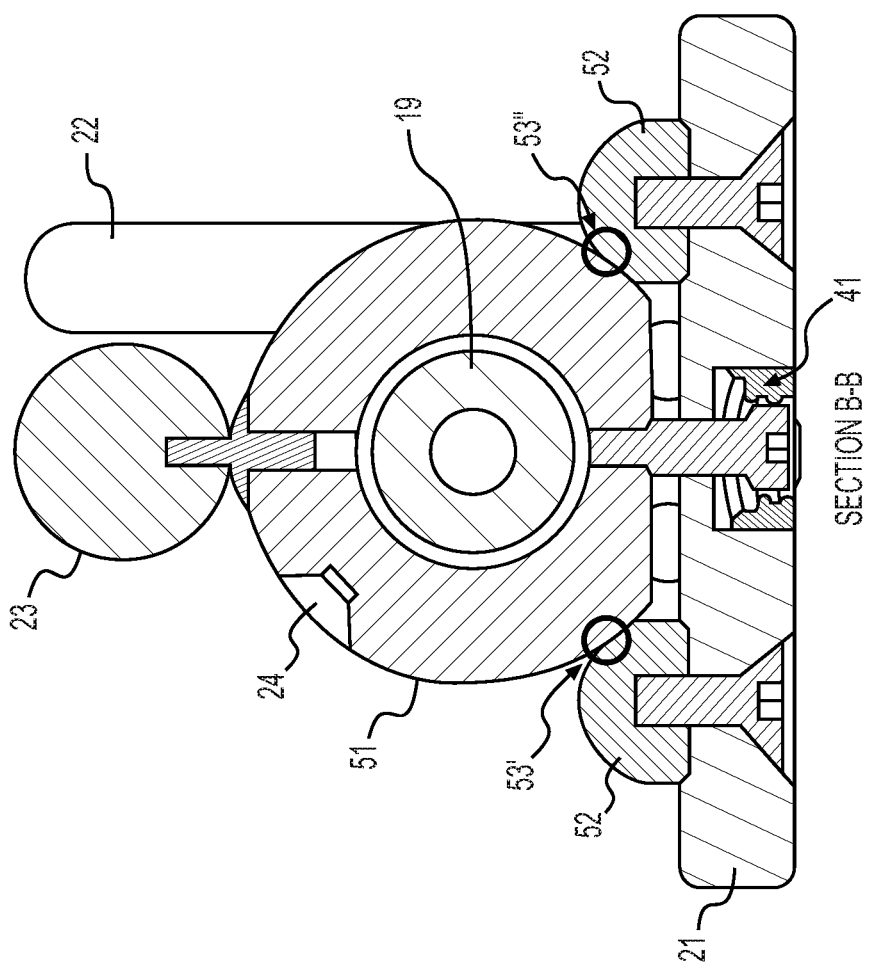
FIG. 4 is a cross-sectional view along the line shown as B-B in FIG. 2.

Referring to FIG. 4, a second end of the artifact is selectively coupled to the support structure by way of a third kinematic mount, such as a mount that provides function similar to a vee component of a traditional Kelvin Clamp. In this way, the third kinematic mount of FIG. 4, when used in conjunction with the first and second kinematic mounts of FIG. 3A, provides an indexing feature for orienting the artifact about second (vertical) and third (lateral) degrees of rotational freedom without over-constraining the artifact.

In some embodiments, the third kinematic mount includes a first portion associated with the support structure and a second portion associated with the artifact. In some embodiments, the first portion of the third kinematic mount includes two mounting spheres ("third" and "fourth" spheres), each defining at least part of an exterior spherical surface for engaging with the second end of the artifact. More specifically, the third and fourth spheres are displaced laterally from each other such that the second end of the artifact can nest therebetween. In some embodiments, the second portion of the third kinematic mount includes a surface (a "second" surface), such as a cylindrical surface defined by the second end of the artifact. In some such embodiments, each of the third and fourth spheres is positioned relative to each other such that each sphere engages the second surface at a respective single point of contact, thereby facilitating indexing of the artifact about second (lateral) and third (vertical) degrees of rotational freedom without over-constraining the artifact, similar to a vee component of a traditional Kelvin Clamp. In other embodiments not shown, an elongated cylindrical element 19 of the length reference bar rests on the two mounting spheres 52 to achieve the vee component of the kinematic mounting system.

Each of the end caps 51 is configured to support a reference member 23, such as a matte sphere that is configured to be used with arm scanners, a spherically mounted retroreflector (SMR) 23 that is configured to be used with a laser tracker, or the like. In some embodiments, each of the end caps 51 includes a reference feature 24, such as a probe receiver or the like. In some embodiments, each end cap 51 includes more than one reference member 23 and/or reference feature 24 so as to increase versatility of the system.

Referring to FIG. 2, a front view of the embodiment of FIG. 1 is shown. As discussed above, the support structure includes a base plate 21 with a handle 22 and mounted kinematically to the base plate 21 is an artifact that compensates for thermal expansion.

FIG. 3A shows a cross-sectional view of the artifact shown in FIG. 2 at sectional line A-A. FIG. 3A shows a cone-type mounting component 32 and a flat-type mounting component. In the embodiment shown in FIG. 3A, respective first portions of the cone-component and flat-component engage with respective second portions of the same, the second portions of each being defined by a first end cap 51. In some embodiments, the present invention includes a first fastening device 30 for selectively biasing the first end cap 51 into engagement with the support structure and/or for preventing or otherwise inhibiting the first end cap 51 from becoming disengaged from the same. In some embodiments, the first fastening device 30 includes one or more feature, such as a spherical washer or the like, so as to avoid, or otherwise minimize, over-constraining the artifact.

FIG. 4 shows a cross-sectional view of the artifact shown in FIG. 2 at sectional line B-B. FIG. 4 shows the second end cap 51 resting on the mounting spheres 52, thereby indexing the artifact about second (lateral) and third (vertical) degrees of rotational freedom. In some embodiments, the present invention includes a second fastening device 41 for selectively biasing the second end cap 51 into engagement with the support structure and/or for preventing or otherwise inhibiting the second end cap 51 from becoming disengaged from the same. In some embodiments, the second fastening device 41 is associated with one or more feature, such as a slot, a biasing spring, or the like, so as to avoid, or otherwise minimize, over-constraining the artifact.

Figure 5:
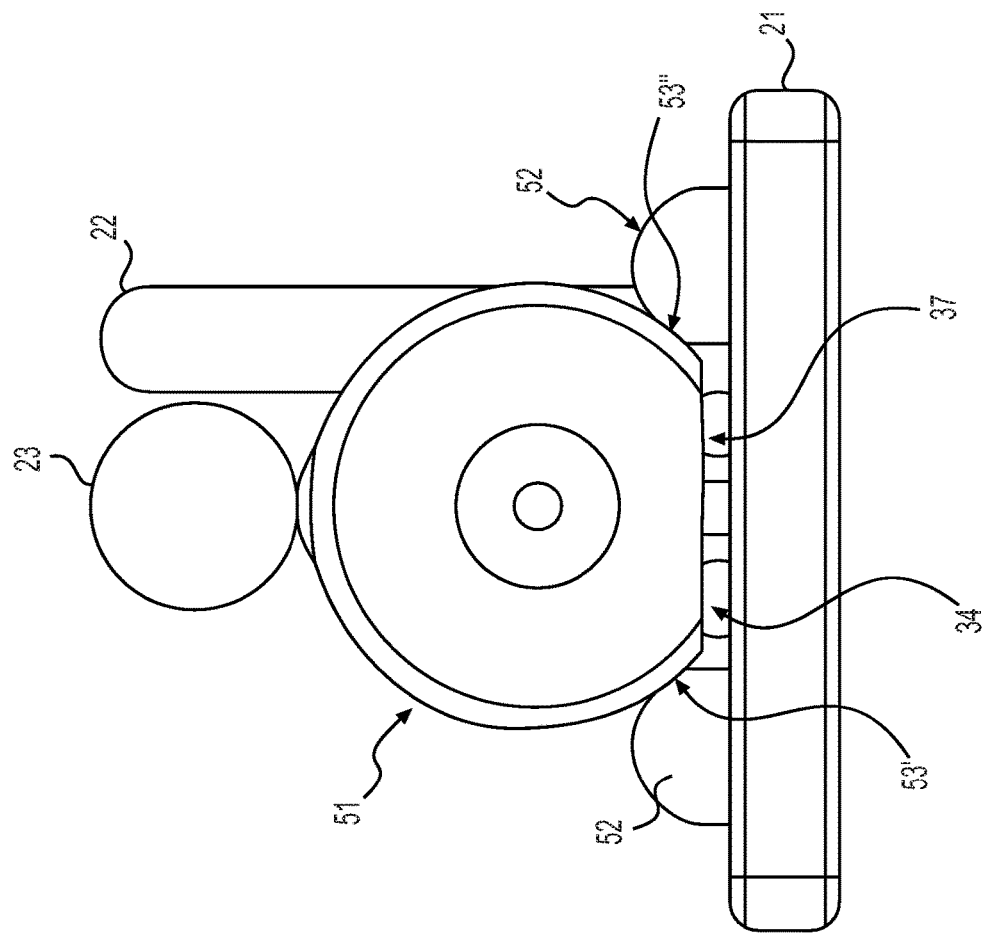
FIG. 5 is an end view of the embodiment of FIG. 1.

FIG. 5 is an end view of the artifact shown in FIGS. 1-4. The third ("vee") component of the kinematic mounting system is shown with the second end cap 51 of the artifact nesting between two mounting spheres of the support structure.

Figure 6:
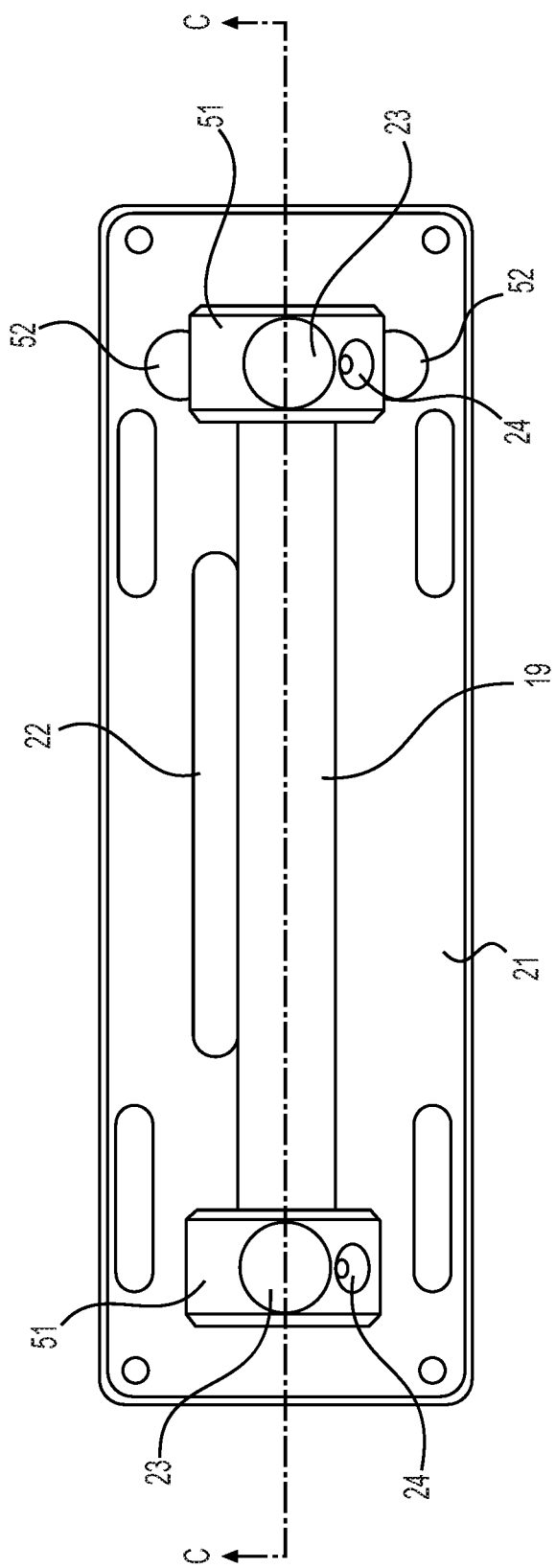
FIG. 6 is a top view of the embodiment of FIG. 1.
Figure 7:
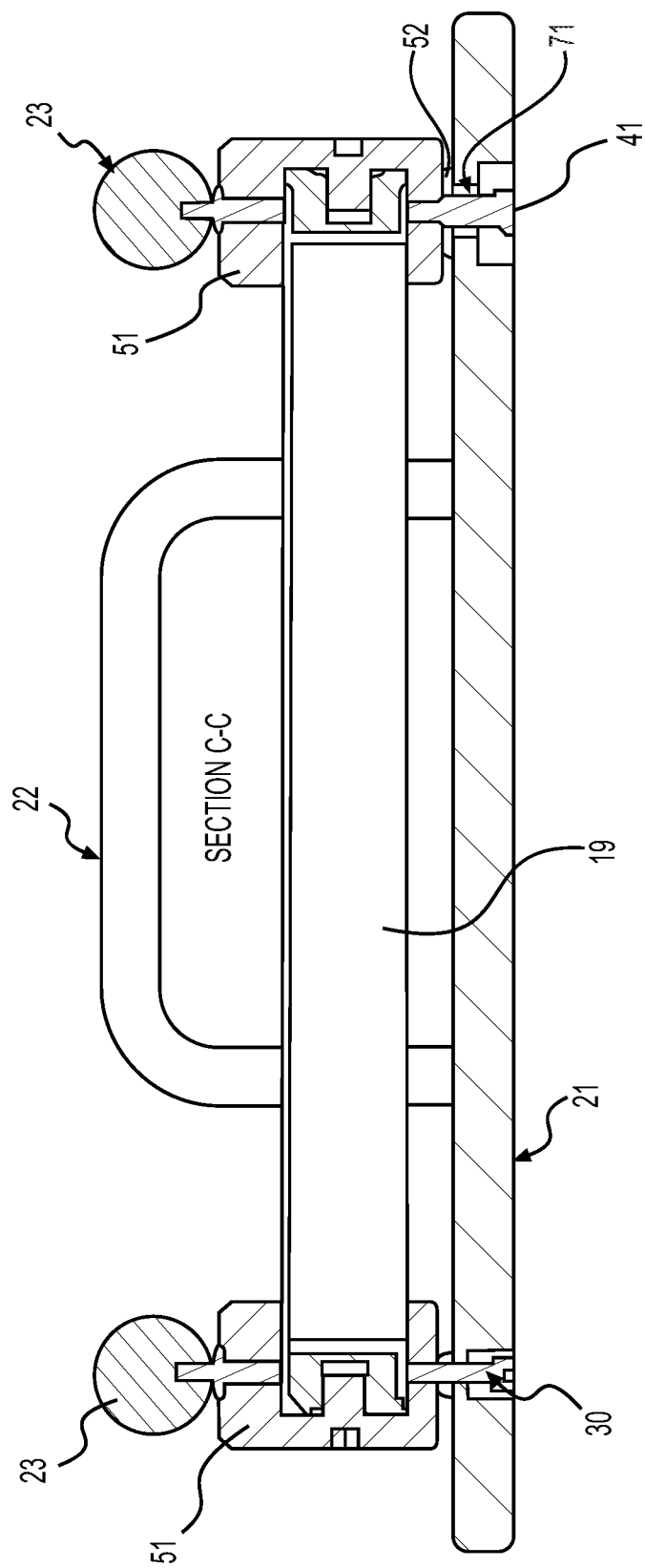
FIG. 7 is a cross-sectional view along the line shown as C-C in FIG. 6.

FIG. 6 is a top view of the artifact shown in FIGS. 1-5. FIG. 7 shows a cross-sectional view of the artifact shown in FIG. 6 at the sectional line C-C. As shown in FIG. 7, the base plate 21 defines a slot 71 configured such that the second fastening device 41 can slide back and forth so that the second end of the artifact is not constrained in the linear direction. Accordingly, the only constraints on the length reference bar relative to the base plate 21 are the three kinematic mounts discussed above.

Figure 8:
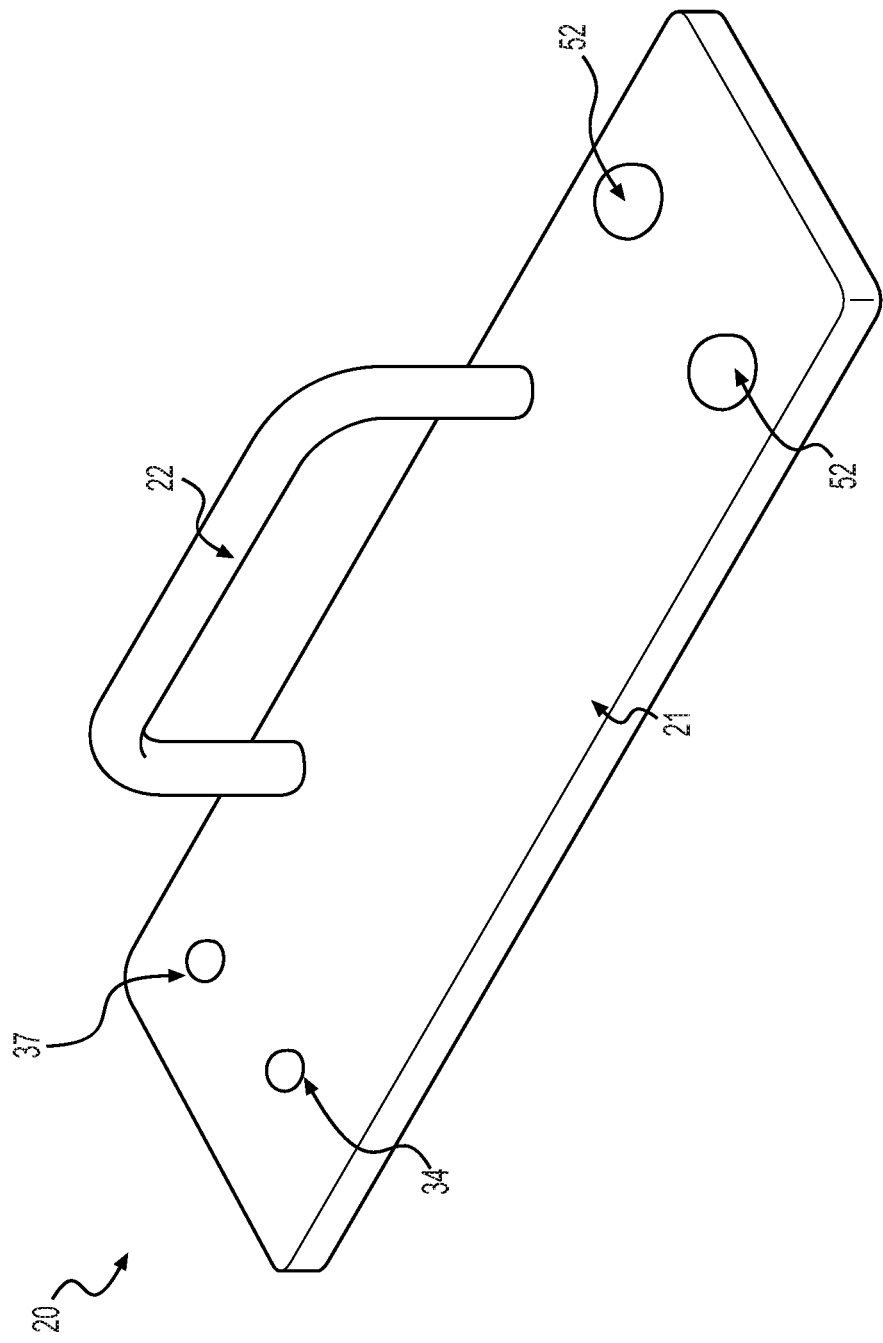
FIG. 8 is an isometric view of one embodiment of a support structure of the present invention.
Figure 9:
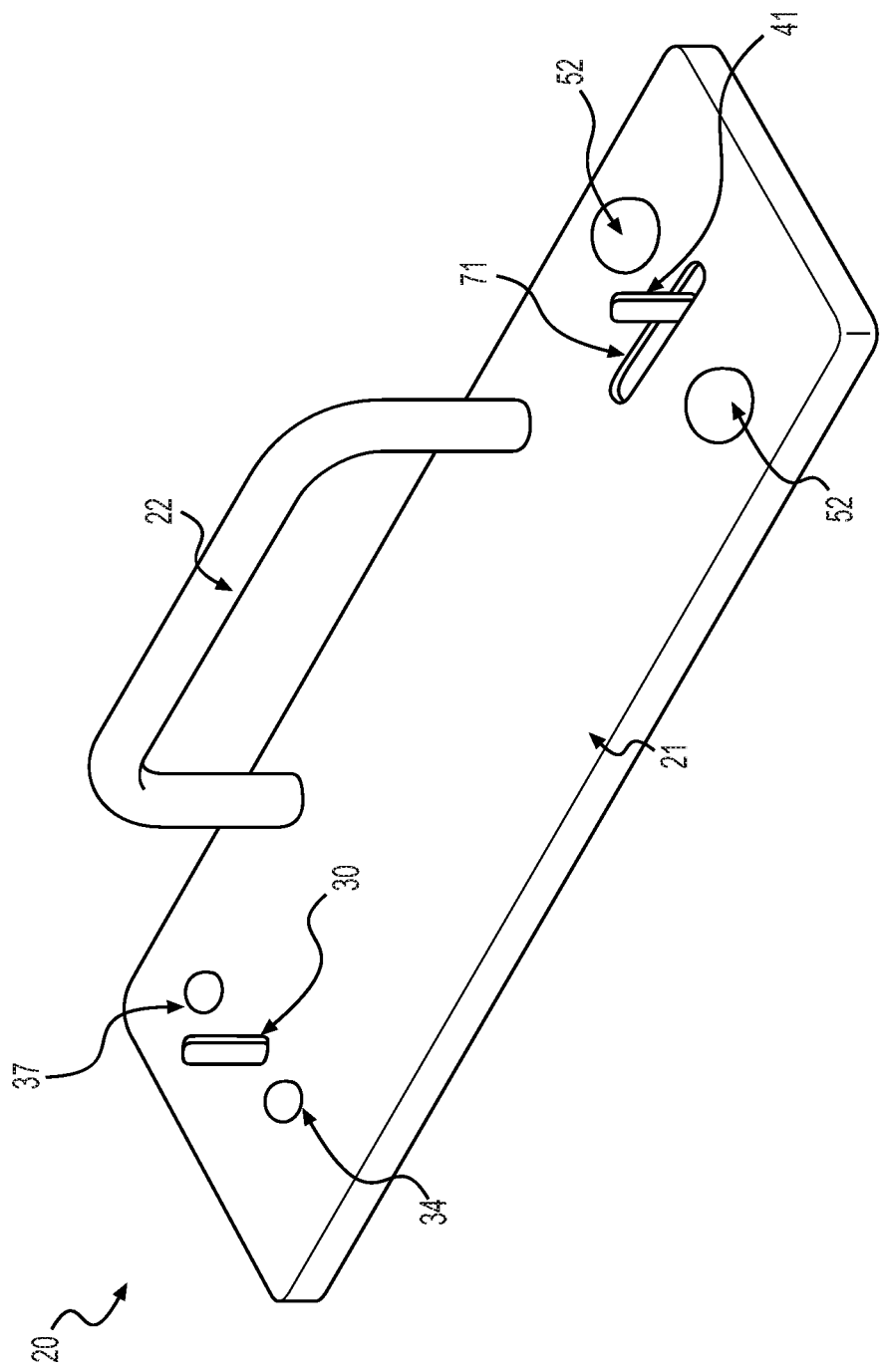
FIG. 9 is an isometric view of another embodiment of a support structure of the present invention.
Figure 10:
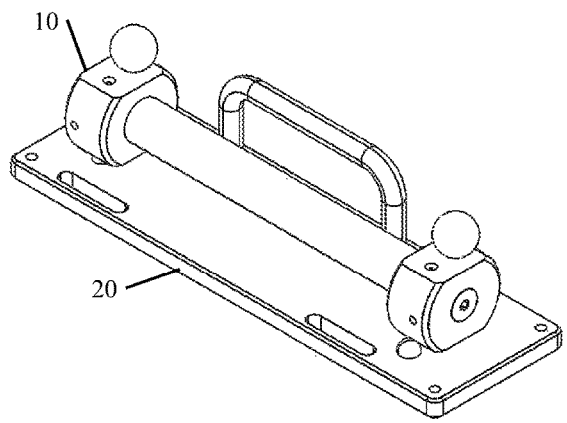
FIG. 10 is an isometric view of another embodiment of an artifact of the present invention engaged with a support structure of the present invention.
Figure 11:
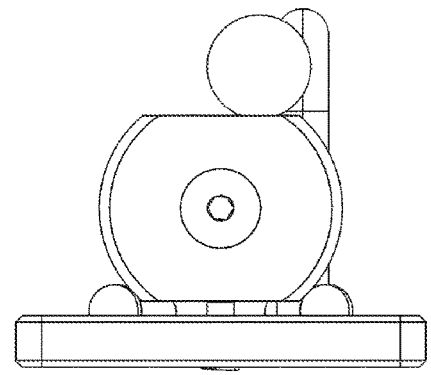
FIG. 11 is an end view of the embodiment of FIG. 10.
Figure 12:
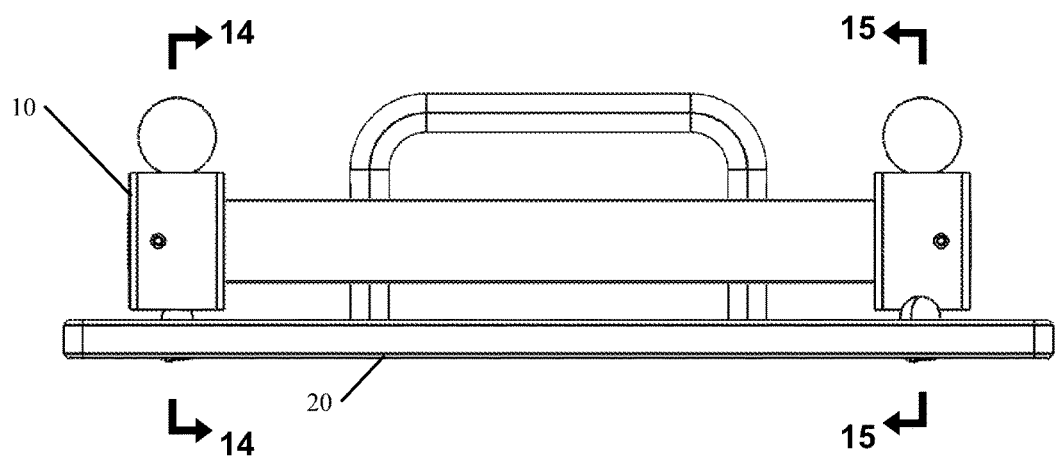
FIG. 12 is a front view of the embodiment of FIG. 10.
Figure 13:
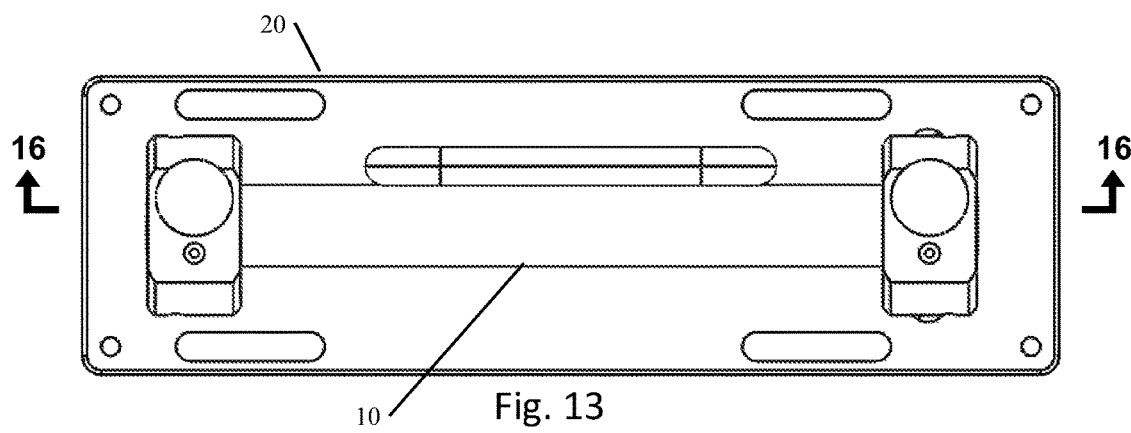
FIG. 13 is a top view of the embodiment of FIG. 10.
Figure 14:
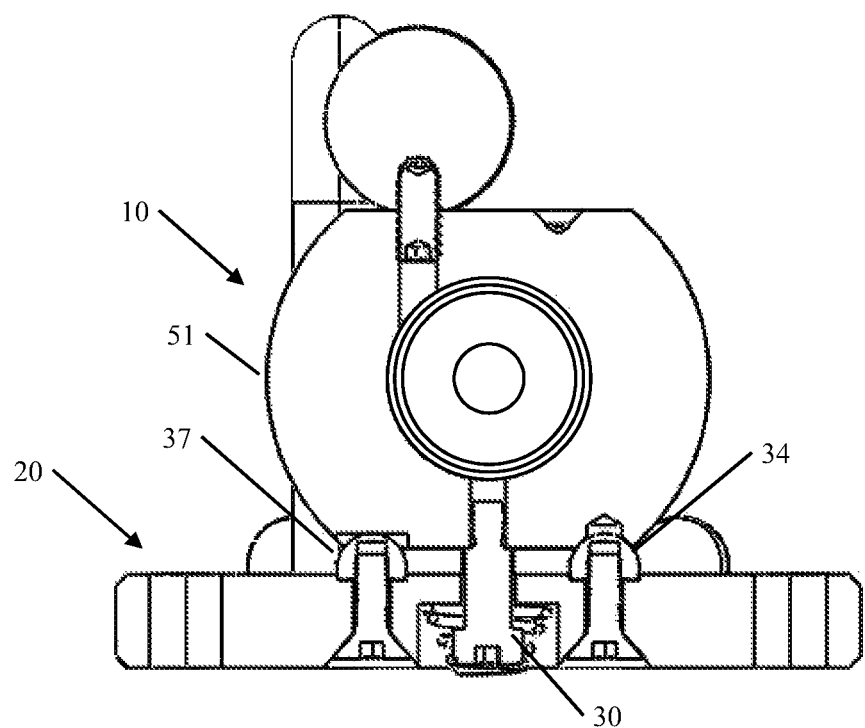
FIG. 14 is a cross-sectional view taken along line 14-14 of FIG. 12.
Figure 15:
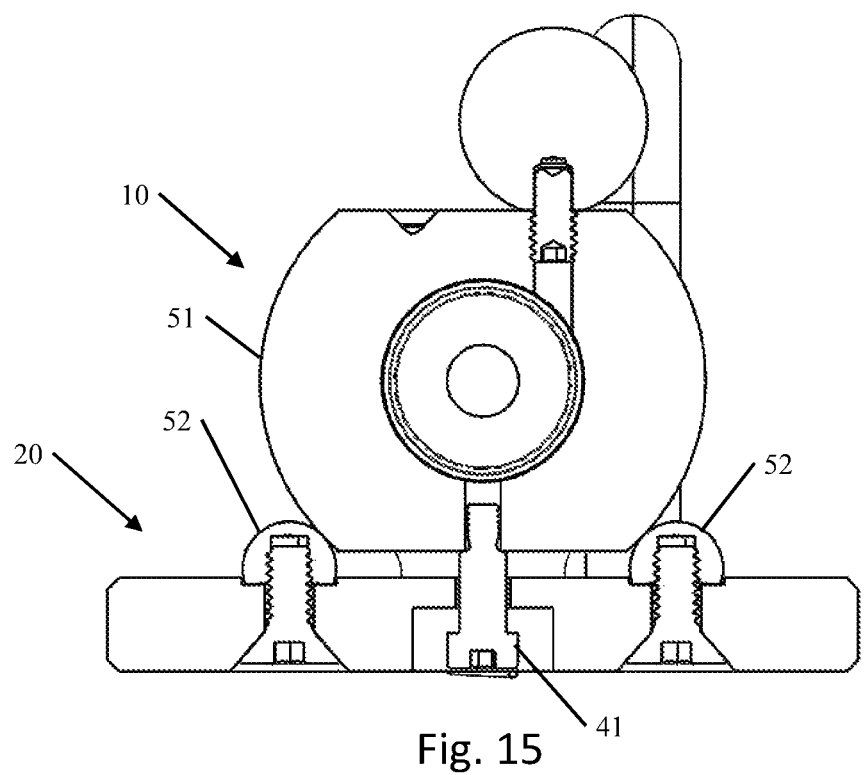
FIG. 15 is a cross-sectional view taken along line 15-15 of FIG. 12.
Figure 16:
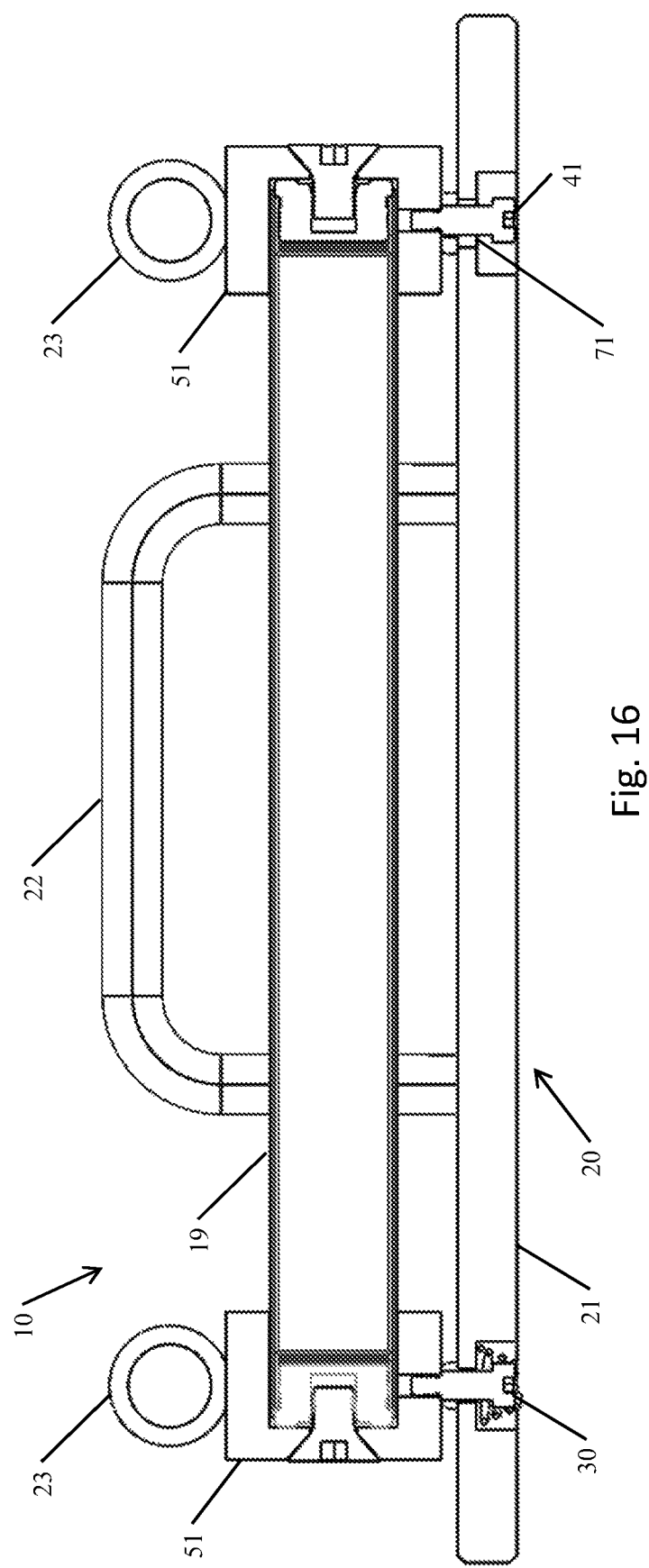
FIG. 16 is a cross-sectional view taken along line 16-16 of FIG. 13.

FIGS. 8 and 9 are isometric views of the kinematic mount base 20 without the linear calibration artifact 10 engaged. Here, the base plate 21, the first interface member 34, the second interface member 37, the third interface member 52, and the handle 22 are viewed without obstruction. FIG. 9 further shows the additional features of the first fastening device 30 situated between the first and second kinematic mounts, and the second fastening device 41 situated between two components of the third interface member 52 and within the slot 71 to allow securing the linear calibration artifact 10 to the base 21 without over-constraining the artifact.

Detailed Description of Several Embodiments of a First Aspect

In a first aspect, the invention provides an article of manufacture that includes a kinematic mount base 20 and a linear calibration artifact 10. In a first embodiment of the manufacture of the first aspect, the kinematic mount base includes a base plate 21, a first interface member 34, a second interface member 37, and a third interface member 52.

In a second embodiment of the manufacture, the linear calibration artifact 10 includes a cylindrical element 19, a first end cap 51 that defines a first interface feature 36 for selective engagement with the first interface member 34, and a second interface feature 39 for selective engagement with the second interface member 37, a second end cap 51 that defines a third interface feature (i.e., the outer cylindrical surface of the second end cap 51) for selective engagement with the third interface member 52, a first reference member 23, and a second reference member 23.

According to the first and second embodiments, the kinematic mount base 20 receives, stabilizes, and minimizes or eliminates constraints on the linear calibration artifact 10.

In a third embodiment, the third interface member 52 of any one of the preceding embodiments includes two components, each component forming a point of contact (53' and 53") with the third interface feature.

In a fourth embodiment, the kinematic mount plate of any one of the preceding embodiments further comprises a first fastening device 30 situated between the first 34 and second 37 interface members.

In a fifth embodiment, the kinematic mount base 20 of any one of the preceding embodiments further includes a handle 22.

In a sixth embodiment, the first interface member 34 and the second interface member 37 of any one of the preceding embodiments are spheres or hemispheres.

In a seventh embodiment, at least one of the two components of the third interface member 52 of any one of the preceding embodiments is a sphere or hemisphere.

In an eighth embodiment, the third interface feature of any one of the preceding embodiments is the surface of a cylinder (or partial cylinder) formed by the second end cap 51.

In a ninth embodiment, the first interface feature 36 of any one of the preceding embodiments is formed by the inner surface of a conical void defined by the first end cap 51.

In a tenth embodiment, the second interface feature of any one of the preceding embodiments is within or includes a flat recessed surface within the first end cap 51.

In an eleventh embodiment, the first reference member 23 is fixed to the first end cap 51 and the second reference member 23 is fixed to the second end cap 51.

In a twelfth embodiment, each of the first and second reference members 23 of any one of the preceding embodiments is a spherically mounted retroreflector.

In a thirteenth embodiment, the first end cap 51 of any one of the preceding embodiments is a cylinder (or partial cylinder) positioned coaxially around a first end of the elongated cylindrical element 19 and the second end cap 51 of any one of the preceding embodiments is a cylinder (or partial cylinder) positioned coaxially around a second end of the cylindrical element 19, and wherein as the cylindrical element 19 expands or contracts, the first and second end caps 51 expand and contract to maintain a constant distance between the first and second reference members 23.

In a fourteenth embodiment, the article of manufacture of any one of the preceding embodiments is portable.

Detailed Description of Several Embodiments of a Second Aspect

In a second aspect, the invention provides an article of manufacture that includes a base plate 21, a first interface member 34, a second interface member 37, and a third interface member 52. In one embodiment of the manufacture of the second aspect, the article of manufacture can receive a linear calibration artifact 10 with no fixturing effects on the linear calibration artifact.

In a second embodiment, the manufacture includes a handle 22 fixed to the base plate 21 to enable convenient portability to the manufacture.

In a third embodiment, the manufacture of any one of the preceding embodiments also includes a linear calibration artifact 10 with mated surfaces to receive the interface members 34, 37, and 52 positioned on the base plate 21.

Detailed Description of Several Embodiments of a Third Aspect

In a third aspect, the invention provides a method (process) for calibrating a coordinate measuring machine. In one embodiment of the third aspect, the method includes the steps of (a) mounting a linear calibration artifact 10, which includes a first target 23 and a second target 23, onto a kinematic mount base 20, (b) transporting the linear calibration artifact 10 and kinematic mount base 23 to a coordinate measuring machine, and (c) taking a first measurement along the linear calibration artifact of the first target. Here, steps (a) and (b) may be performed in any order, but before step (c).

In a second embodiment, the method further includes the step of (d) taking a second measurement along the linear calibration artifact 10 of the second target 23. Here, step (d) is performed after step (c).

In a third embodiment, the method of the second embodiment further includes the steps (e) comparing the first measurement to the second measurement to yield a result, and then (f) comparing the result to a predefined factor to determine whether the coordinate measuring machine is working properly.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

What is claimed is:

1. An article of manufacture comprising:
   a kinematic mount base comprising:
      a base plate,
      a first interface member,
      a second interface member, and
      a third interface member; and
   a linear calibration artifact comprising:
      a cylindrical element;
      a first end cap defining:
         a first interface feature for the first interface member; and
         a second interface feature for the second interface member;
      a second end cap comprising a third interface feature for the third interface member;
      a first reference member, and
      a second reference member,
   wherein kinematic mount base receives, stabilizes, and minimizes or eliminates constraints on the linear calibration artifact.

2. The article of manufacture of claim 1, wherein the third interface member comprises two components, each component forming a point of contact with the third interface feature.

3. The article of manufacture of claim 1, wherein the kinematic mount plate further comprises a first fastening device situated between the first interface member and the second interface member.

4. The article of manufacture of claim 2, wherein the kinematic plate further comprises a second fastening device situated between the two components of the third interface member.

5. The article of manufacture of claim 4, wherein the second fastening device moves within a slot in the base plate.

6. The article of manufacture of claim 1, wherein the kinematic mount base further comprises a handle.

7. The article of manufacture of claim 1, wherein the first interface member and the second interface member each form at least a partial sphere.

8. The article of manufacture of claim 2, wherein at least one of the two components of the third interface member forms at least a partial sphere.

9. The article of manufacture of claim 8, wherein the third interface feature comprises two regions of a surface that is at least partially cylindrical.

10. The article of manufacture of claim 7, wherein the first interface feature comprises an inner surface of a conical void.

11. The article of manufacture of claim 7, wherein the second interface feature comprises a flat recessed surface.

12. The article of manufacture of claim 1, wherein the first reference member is fixed to the first end cap and the second reference member is fixed to the second end cap.

13. The article of manufacture of claim 12, wherein each of the first and second reference members is a spherically mounted retroreflector.

14. The article of manufacture of claim 12, wherein the first end cap is positioned coaxially around a first end of the cylindrical element and the second end cap is positioned coaxially around a second end of the cylindrical element, and wherein as the cylindrical element expands or contracts, the first and second end caps expand and contract to maintain a constant distance between the first and second reference members.

15. The article of manufacture of claim 1, wherein the article of manufacture is portable.

16. An article of manufacture comprising:
   a base plate,
   a first interface member,
   a second interface member, and
   a third interface member,
   wherein the article of manufacture can receive a linear calibration artifact with no fixturing effects on the linear calibration artifact.

17. The article of manufacture of claim 16, further comprising a handle fixed to the base plate, wherein the article of manufacture is portable.

18. A process for calibrating a coordinate measuring machine, the method comprising:
   mounting a linear calibration artifact onto a kinematic mount base, wherein the linear calibration artifact comprises a first target and a second target;
   transporting the linear calibration artifact and kinematic mount base to a coordinate measuring machine; and
   taking a first measurement along the linear calibration artifact of the first target.

19. The method according to claim 18, further comprising taking a second measurement along the linear calibration artifact of the second target.

20. The method according to claim 19, further comprising:
   comparing the first measurement to the second measurement to yield a result; and
   comparing the result to a predefined factor to determine whether the coordinate measuring machine is working properly.

* * * * *